May 28, 1963 F. WEBSTER 3,091,354
LOADING DEVICES FOR MOUNTING ON VEHICLES
Filed Sept. 10, 1957 2 Sheets-Sheet 1
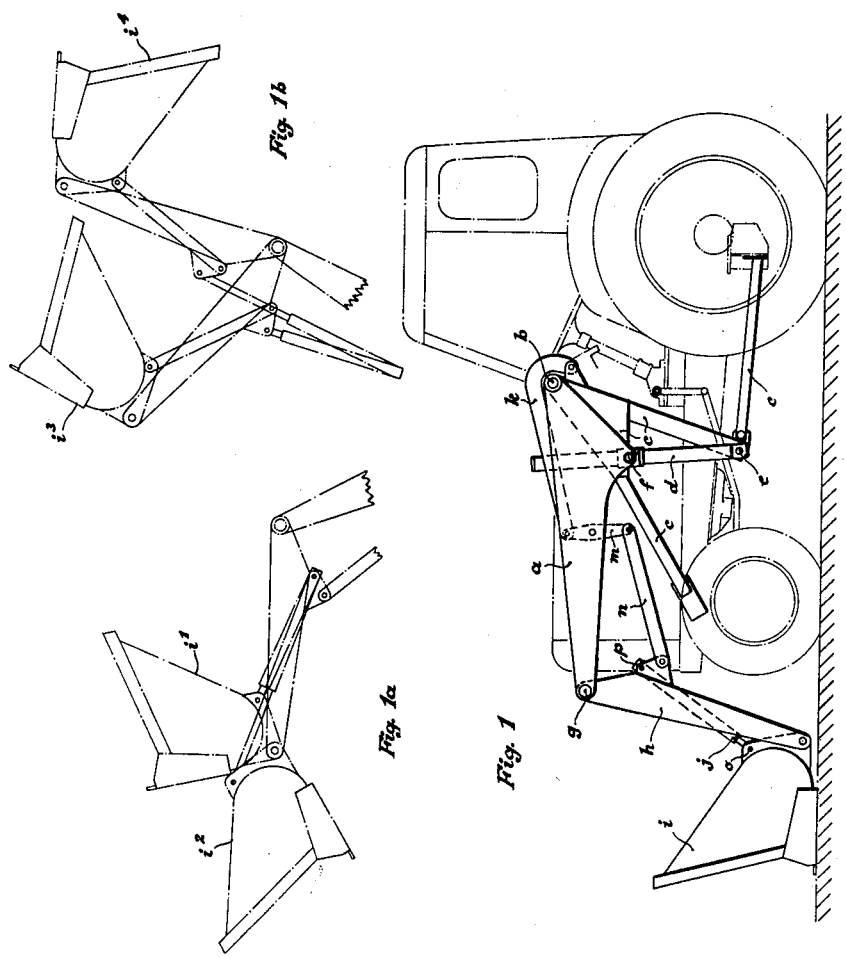
Inventor
FREDERICK WEBSTER
By Norris & Bateman
Attorneys May 28, 1963   F. WEBSTER   3,091,354
LOADING DEVICES FOR MOUNTING ON VEHICLES
Filed Sept. 10, 1957   2 Sheets-Sheet 2
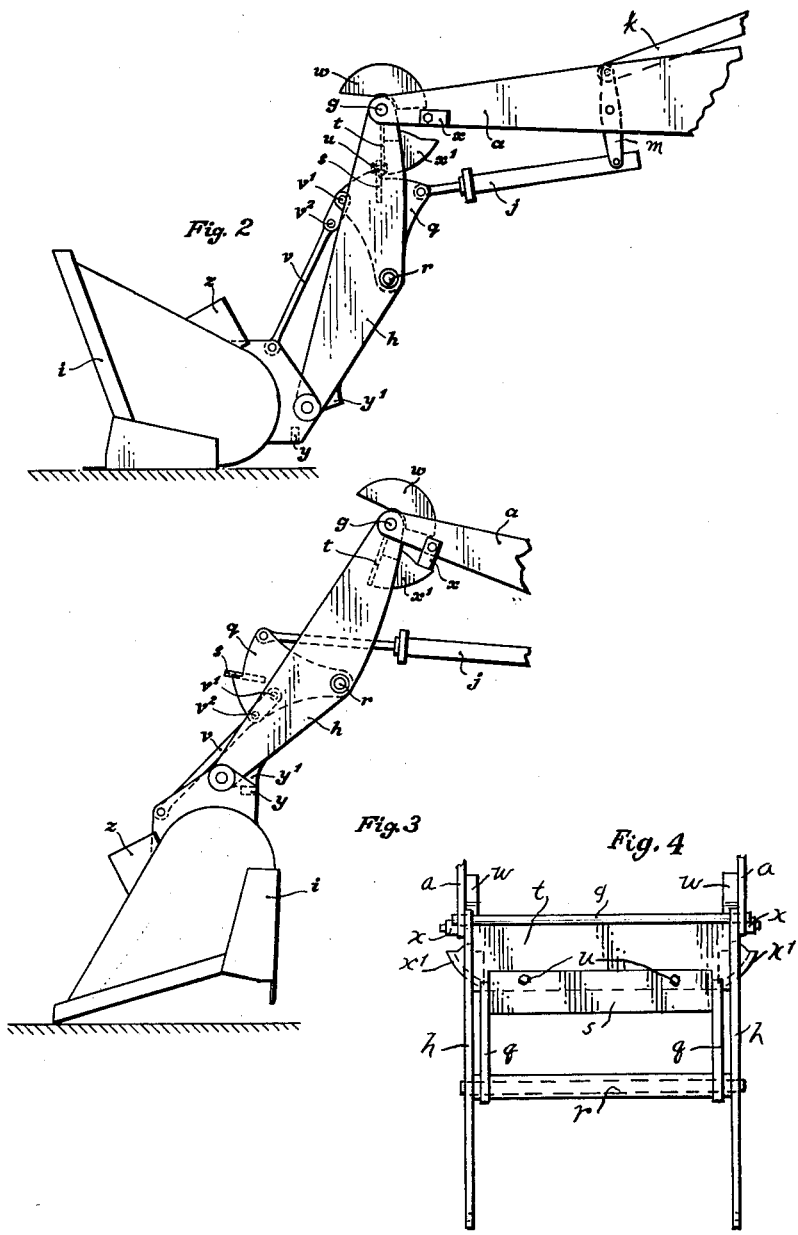
Inventor
FREDERICK WEBSTER
By Norris & Bateman
Attorneys United States Patent Office 3,091,354
Patented May 28, 1963

3,091,354
LOADING DEVICES FOR MOUNTING ON VEHICLES
Frederick Webster, Meltham, Huddersfield, England, assignor, by mesne assignments, to David Brown Tractors Limited, Meltham, Huddersfield, England, a company of Great Britain
Filed Sept. 10, 1957, Ser. No. 683,085
Claims priority, application Great Britain Sept. 15, 1956
5 Claims. (Cl. 214—140)

The invention relates to power operated loading devices for mounting on tractors or like vehicles, of the kind by means of which loose bulky materials such as soil, rock, sand or gravel may readily be moved from place to place, or loaded into a cargo carrying body on a separate motor vehicle or, in some cases, on the vehicle itself or on a trailer hitched thereto. Such arrangements may also be used for light excavating.

Loading devices are generally divided into two types, namely front end loaders which both dig and dump their load at the front end of the vehicle on which they are mounted, and which cannot therefore load the said vehicle itself or a trailer hitched thereto; and overloaders which dig at the front and dump at the rear of the vehicle on which they are mounted, and can thus very easily load a cargo-carrying body provided in any of the positions referred to in the preceding paragraph.

In either type of loading device, two laterally spaced lifting arms are usually provided, each pivoted at one end on the vehicle frame and pivotally connected at the other to a bucket disposed between them, main control means, usually comprising a pair of hydraulic ram and cylinder assemblies, being provided for moving the said arms relative to the vehicle frame, and secondary control means being provided for moving the bucket relative to the lifting arms.

The object of the invention is to provide a loading device which can be operated either as a front end loader or as an overloader and which can quickly and easily be adapted to perform either operation when previously adapted to perform the other operation.

Another object of the invention is to provide a loading device which can be further adapted to perform light bulldozing operations.

According to the invention a tractor mounted loading device comprises a pair of main lifting arms pivotally connected to the tractor; main control means for raising and lowering the main lifting arms; a pair of secondary lifting arms pivoted on the said main arms; a bucket pivotally connected between the free ends of the secondary arms; and additional control means for moving the said secondary arms relative to the main arms and/or the bucket relative to the secondary arms.

In the accompanying drawings FIG. 1 shows in side elevation one embodiment of the invention mounted on a tractor vehicle the latter being shown in broken lines; FIG. 1(a) shows this arrangement performing a front end loading operation and FIG. 1(b) shows it performing an overloading operation; FIG. 2 shows a modification of the invention adapted to perform an overloading operation; and FIG. 3 shows the latter embodiment adapted to perform light bulldozing work. FIGURE 4 is a fragmentary front elevation further illustrating the embodiment of FIGURES 2 and 3.

Referring now to FIG. 1, which shows the device adapted to perform a front end loading operation, a pair of lifting arms $a,a$ are freely pivoted at their rearward ends about an upper transverse cross-shaft $b$ carried by a framework $c$ adapted to be mounted on a tractor. The said lifting arms are arranged one on each side of the said tractor and are angularly movable about the cross-shaft $b$ by main control means comprising a pair of hydraulic ram and cylinder assemblies $d,d$, the rams of which are pivotally connected to the respective ends of a lower transverse cross-shaft $e$ carried by the framework $c$ whilst the cylinders are pivotally connected, at points such as $f$, to the respective lifting arms $a,a$.

The forward ends of the lifting arms $a,a$ are connected together by a shaft $g$, on which are freely pivoted a pair of arms $h,h$ the free ends of which carry pivotally between them a bucket $i$. The angular position of the arms $h,h$, relative to the lifting arms $a,a$, is governed by a laterally spaced pair of linkage arrangements which each comprise a link $k$ and a lever $m$ pivoted intermediate its ends on the respective arms $a$, and a link $n$ connecting one end of the lever $m$ to the apropriate arm $h$. Link $k$ is pivoted at one end directly on the frame to the rear of cross-shaft $b$, and is pivotally connected at its other end to one end of lever $m$. The said pair of linkage arrangements do not form an essential feature of the present invention but impart an automatic "roll-back" action to the bucket as the device is operated. The angular position of the bucket $i$, relative to the arms $h,h$, is governed by additional, or secondary, control means comprising a laterally spaced pair of double-acting ram and cylinder assemblies $j,j$ the rams of which are connected by pins such as $o$ to the bucket and the cylinders of which are pivotally connected by pins such as $p$ to the respective arms $h,h$.

The source of pressure fluid, a tractor-engine-driven pump, for supplying the main and secondary control means is not shown, neither are the valve means or the conduit means for hydraulically connecting the said source to the control means, since these are of conventional construction.

The operation of the device when arranged in the manner just described is as follows:

The bucket $i$ is filled by driving it forwardly into a pile of material which, for example, it may be desired to load into a truck. The loaded bucket is then lifted to the position $i^1$, shown in FIG. 1(a), by the actuation of the main control means, the ram and cylinder assemblies $d,d$. With the bucket elevated thus, the tractor on which it is mounted can be manoeuvred into the correct position for discharging the load. To discharge the loaded bucket, the secondary control means, the ram and cylinder assemblies $j,j$, are actuated to tip the said bucket, about the points of its attachment between the arms $h,h$, to a position $i^2$. Subsequent operation of the main and secondary control means to retract the respective hydraulic rams is effective to return the bucket $i$ to its lowered position in readiness for a further loading operation.

The device can be adapted to perform an overloading operation, as shown in FIG. 1b of the drawings, by interchanging the secondary control means and the links $n,n$. So arranged, the device can be operated as a dual pivot overloader by the successive actuation of the main control means and the secondary control means. Actuation of the main control means is effective to raise the bucket $i$ to a position $i^3$ and actuation of the secondary control means is effective to swing said bucket rearwardly about the shaft $g$ to a position $i^4$, in which position material in said bucket is discharged at the rear of the vehicle. The cylinder end of each assembly $j,j$ is here pivoted upon the lower end of the associated lever $m$ in the manner shown in FIGURE 2.

It will, of course, be seen that if the links $n,n$ (or the ram and cylinder assemblies $j,j$) were adapted to govern the position of the arms $h,h$, relative to the lifting arms $a,a$, by being directly connected between the said arms $h,h$ and the said lifting arms $a,a$ in such a manner that the said links and the said ram and cylinder assemblies could still be interchanged, instead of being connected to the pair of levers $m,m$, the object of the invention could still be achieved and the scope of invention would not in any way be departed from.

An alternative though more expensive arrangement, obviating the need for interchangeable parts, would be to provide the device with a further pair of ram and cylinder assemblies in place of the links $n,n$.

In a modified construction, as illustrated by FIGS. 2 and 3 of the acompanying drawings, the arms $h,h$, carrying the bucket $i$ pivotally between them, are each provided with a rocking member $q$ capable of pivotal movement about a shaft $r$ carried by arms $h,h$. The rocking members $q,q$ are connected together by means of a plate member $s$ which is adapted to be clamped fast with a plate member $t$, connecting the arms $h,h$, by a pair of nut and bolt assemblies $u,u$, as shown in FIGURES 2 and 4. The bucket $i$ is pivotally connected to the rocking members $q,q$ by means of a pair of link members $v,v$ pinned to the respective rocking members through holes $v^1,v^1$ or $v^2,v^2$ and hence, when arranged as in FIG. 2 with the said rocking members clamped fast and connected to the said link members through the holes $v^1,v^1$, the said bucket is, in effect, fast with the arms $h,h$ and the device is therefore adapted to perform an over-loading operation. The angular position of the arms $h,h$, relative to the lifting arms $a,a$, when the device is thus adapted, is governed as in the previously described embodiment by the ram and cylinder assemblies $j,j$, the cylinders of which are pivotally connected to the lower ends of the respective levers $m$ (FIGURE 2) and rams of which are pivotally connected to the respective rocking members $q,q$, temporarily fast with the said arms $h,h$, and the device is operated in precisely the same manner as that previously described and illustrated by FIG. 1($b$).

An added refinement shown in FIGS. 2 and 3 is the provision of a stop $w$ fast with each lifting arm $a$ to arrest the rearward swing of the arms $h,h$ when the bucket is discharged.

When it is desired to perform a front end loading operation the nut and bolt assemblies $u,u$ are removed so that the rocking members $q,q$ and the bucket $i$ are free to pivot with respect to the arms $h,h$ under the influence of the ram and cylinder assemblies $j,j$; a pair of stops $x,x$ carried by the lifting arms $a,a$ are adjusted in position so as to project therefrom and to contact associated stops $x^1,x^1$ fast with the arms $h,h$; and it has also been found desirable to shorten the effective lengths of the link members $v,v$ by connecting them to the respective rocking members $q,q$ through the holes $v^2,v^2$, in order to facilitate a so-called "roll-back" action of the bucket $i$ at ground level which is obtainable by the controlled actuation of the ram and cylinder assemblies $j,j$.

The angular position of the arms $h, h$, relative to the lifting arms $a, a$, is in this case maintained constant during the lifting and front end tipping operations, the force of gravity holding the stops $x, x$, and $x^1, x^1$, in contact.

The operation of the device when arranged in this manner is as follows:

With the rams of the main and secondary control means retracted, i.e. with the bucket $i$ in the lowered position, the latter is filled by driving it forwardly into a pile of material. The said bucket is then lifted into a position such as $i^1$ in said FIG 1($a$) by the controlled actuation of the ram and cylinder assemblies $d, d$, the lifting arms $a, a$ and the arms $h, h$ moving together as a single part about the cross-shaft $b$. With the bucket elevated thus the tractor can be manoeuvred into position to discharge the load. To tip the loaded bucket the ram and cylinder assemblies $j, j$ are actuated to cause the rocking members $q, q$ to pivot forwardly about the shaft $r$. The said bucket is thereby caused to tip forwardly about the points of its attachment to the arms $h, h$, helped by the weight of the load of material, until a pair of stops $y, y$ carried by the bucket contact a pair of stops $y^1, y^1$ formed on the respective arms $h, h$. Subsequent operation of the main and secondary control means to retract their respective hydraulic rams is effective to return the bucket $i$ to its lowered position in readiness for a further loading operation.

The invention is also capable of being adapted to perform light bulldozing operations, as illustrated by FIG. 3. When so adapted the rocking members $q, q$ are, as when the device is arranged for front end loading, free to pivot, under the action of the ram and cylinder assemblies $j, j$, relative to the arms $h, h$. The stops $x, x$ are likewise arranged to project from the lifting arms $a, a$ to limit the rearward swing of the arms $h, h$ relative thereto, and the link members $v, v$ are connected to the rocking members $q, q$ by means of the holes $v^2, v^2$ to employ the shorter of their effective lengths.

The operation of the device when adapted for bulldozing requires only the initial actuation of the ram and cylinder assemblies $j, j$, to invert the bucket $i$ about the points of its attachmetnt to the arms $h, h$, and the controlled actuation of the ram and cylinder assemblies $d, d$ to adjust the working height of the said bucket. The face of the bucket is then utilized as a bulldozer blade when the tractor is driven forwards, a plate $z$ welded to the said bucket deflecting the displaced material forwardly from the bucket at a suitable height above the ground.

It will be understood that alternative means, such as a hydraulically operated device, may be provided for locking the rocking members $q, q$ fast with the arms $h, h$ and that hydraulically operated means may also be provided for positioning the stops $x, x$ without departing in any way from the scope of the invention.

What I claim is:

1. In a tractor, a frame, a pair of main lifting arms each of which is pivoted at one of its ends on said frame, a pair of secondary arms each of which is pivoted on the other end of one of said main arms, a bucket pivotally mounted directly on and between said secondary arms, means for actuating said lifting arms to swing in a predetermined direction for selectively raising said bucket to first and second positions where said bucket is respectively disposed to discharge forwardly of the tractor and to discharge rearwardly of the tractor, an inextensible link removably pivotally connected to one of said main arms intermediate the ends thereof and to that one of said secondary arms which is pivoted on said one main arm to determine the angular relation between said main and secondary arms, an extensible hydraulic cylinder assembly removably pivotally connected between said one secondary arm and said bucket and being extensible to tilt and thereby effectuate discharge of said bucket when the latter is in said first raised position, said hydraulic cylinder assembly and said inextensible link being selectively mutually interchangeable for pivotally mounting the inextensible link between said bucket and said one secondary arm in place of said hydraulic cylinder assembly to establish a fixed angular relationship between said bucket and said secondary arm and further for pivotally mounting said hydraulic cylinder assembly between said ones of said main and secondary arms enabling said hydraulic cylinder assembly by extension thereof to swing said secondary arms outwardly from said main arms to tiltably effectuate discharge of said bucket when in said second raised position.

2. In a tractor, a pair of main lifting arms each of which is pivoted at one of its ends on said tractor, a pair of secondary lifting arms each of which is pivoted on the other end of one of said main arms, a bucket pivotally connected between the free ends of said secondary arms, at least one flexible linkage comprising a rocking member pivoted on one of said secondary arms, a link pivotally connecting said bucket and said rocking member, means for releasably locking said rocking member to said one secondary arm, and extensible hydraulic cylinder means connected between said rocking member and a point intermediate the ends of that one of said main arms to which said one secondary arm is pivoted, and means for raising and lowering said main arms.

3. In the tractor defined in claim 2, stop means on the bucket and secondary arms coacting to limit rocking movement of the bucket when said locking means is released.

4. In a tractor, a pair of main lifting arms each of which is pivoted at one of its ends on said tractor, a pair of secondary lifting arms each of which is pivoted on the other end of one of said main arms, a bucket pivotally connected between the free ends of said secondary arms, at least one flexible linkage comprising a rocking member pivoted on one of said secondary arms, a link pivotally connecting said bucket and said rocking member, means for releasably locking said rocking member to said one secondary arm, and extensible hydraulic cylinder means connected between said rocking member and a point intermediate the ends of that one of said main arms to which said one secondary arm is pivoted, coacting stop means adapted to limit movement of the bucket relative to the secondary arms when said rocking member is released to pivot on said one secondary arm, coacting stop means adapted to limit movement of the secondary arms relative to the main arms when said rocking member is locked to said one secondary arm, and means for raising and lowering said main arms.

5. In a tractor, a pair of main lifting arms each of which is pivoted at one of its ends on said tractor, a pair of secondary arms each of which is pivoted on the free end of one of said main arms, a bucket pivotally mounted between said secondary arms, a pair of rocker arms pivoted on said secondary arms, extensible hydraulic cylinder means pivotally connecting points intermediate the ends of said main arms to said rocker arms, links pivotally connected between said rocker arms and said bucket, means for releasably locking said rocker arms to said secondary arms, means for actuating said lifting arms to swing in a predetermined direction to a first position to selectively locate said bucket in a raised front loading position where the bucket is disposed to discharge forwardly of the tractor, or swing said main lifting arms further in the same direction to a raised rear loading position for bucket discharge rearwardly of the tractor, and means for extending said hydraulic cylinder means in the selected raised bucket position for effecting discharge of the bucket.

References Cited in the file of this patent
UNITED STATES PATENTS

| | | |
|---|---|---|
| 2,227,624 | Benbow et al. | Jan. 7, 1941 |
| 2,451,101 | Leschinsky | Oct. 12, 1948 |
| 2,560,674 | Westall | July 17, 1951 |
| 2,603,374 | McNamara | July 15, 1952 |
| 2,774,496 | Dorkins | Dec. 18, 1956 |
| 2,775,356 | Lessmann | Dec. 25, 1956 |
| 2,790,256 | Beyerstedt | Apr. 30, 1957 |
| 2,811,265 | Wagner | Oct. 29, 1957 |
| 2,843,947 | Anderson et al. | July 22, 1958 |

FOREIGN PATENTS

| | | |
|---|---|---|
| 769,646 | France | June 11, 1934 |
| 110,589 | Sweden | May 9, 1944 |
| 1,025,035 | France | Jan. 21, 1953 |
| 1,122,277 | France | May 22, 1956 |
| 764,855 | Great Britain | Jan. 2, 1957 |